United States Patent [19]

Voers

[11] Patent Number: 5,288,929
[45] Date of Patent: Feb. 22, 1994

[54] METHOD FOR REMOVING, CONDENSING AND COLLECTING PROPELLANTS FROM FOAM MATERIALS

[75] Inventor: Lau O. Voers, Hjortshoej, Denmark

[73] Assignee: L&E Holding ApS, Hjortshoej, Denmark

[21] Appl. No.: 834,555

[22] PCT Filed: Aug. 17, 1990

[86] PCT No.: PCT/DK90/00213
§ 371 Date: Feb. 12, 1992
§ 102(e) Date: Feb. 12, 1992

[87] PCT Pub. No.: WO91/02638
PCT Pub. Date: Mar. 7, 1991

[30] Foreign Application Priority Data

Aug. 21, 1989 [DK] Denmark .............................. 4084/89
May 28, 1990 [DK] Denmark .............................. 1306/90

[51] Int. Cl.⁵ .............................................. C07C 17/38

[52] U.S. Cl. .................................... 570/177; 570/211; 570/238; 570/262

[58] Field of Search ................. 570/177, 211, 238, 262

[56] References Cited

U.S. PATENT DOCUMENTS 5,175,381 12/1992 Hoberg et al. ...................... 570/177

*Primary Examiner*—Marianne M. Cintins
*Assistant Examiner*—John Peabody
*Attorney, Agent, or Firm*—Watson, Cole, Grindle & Watson

[57] ABSTRACT

A method for removing, condensing and collecting propellants, e.g. chlorofluoro-carbons (CFCs) in an environmentally friendly manner from foam materials, e.g. insulant materials from old (discarded) refrigerators, district heating tubes and other materials for which the method is suitable.

7 Claims, No Drawings

METHOD FOR REMOVING, CONDENSING AND COLLECTING PROPELLANTS FROM FOAM MATERIALS

BACKGROUND OF THE INVENTION

The invention relates to a method for driving off and collecting propellants, e.g. chlorofluoro-carbons (CFCs) from foam materials, e.g. insulating foam in refrigerators, freezers, district heating tubes, etc, which method involves the use of a closed container in which a mechanical decomposition of the product is effected.

By other prior art techniques it is only possible to destroy these foam products in such a manner that the propellants are liberated and either escape into the atmosphere thus charging the environment and/or are being decomposed to highly poisonous products.

From DE-A-3,830,118 a method is described by which the liberation of the propellants is effected in a closed chamber defined by a cylinder and two pistons. However, such chamber would be inconvenient as it is difficult to provide sealings by which any escape of propellants into the atmosphere is obviated.

It is the object of the invention to remedy the above drawbacks and to provide an environmentally friendly method for driving off and collecting propellants, e.g. CFCs from foam material. This object is achieved with a method being characterized in that the mechanical decomposition of the product and the liberation of the propellant is effected inside a cup-shaped process container having the closed part of the cup turned upwardly and the open part of the cup placed below the surface of a liquid medium, e.g. water, under/in which liquid medium the decomposition and liberation is effected.

If foam products are decomposed mechanically (crushed) without being surrounded by a liquid medium it is difficult to condense the propellants sufficiently as the propellant gases are mixed with large amounts of air which impedes an efficient condensing of the propellants.

Accordingly, these materials are being deposited for being removed/destroyed at a later time when a suitable method has been developed.

Herein, the term "process container" refers to, e.g. the part of the equipment which comprises the cup-shaped process vessel in which the mechanical decomposition and optional condensing takes place, and the part of the equipment which is necessary for collecting the propellant gases and non-condensable gases.

The method is based on the fact that the mechanical decomposition of the foam material which may be attached to one or more solid sides, e.g. a side plate of a refrigerator takes place in such a manner that the propellant does not escape into the atmosphere, as the foam material together with the propellants during the decomposition process and the liberation process, is surrounded/confined and thus in contact with a liquid medium, e.g. water.

In the present specification, the term "process container" is used describing the part of the equipment which e.g. contains of: A cup-shaped process vessel in which the mechanical decomposition and an optional condensing takes place and the part of the equipment which is necessary for the collecting of the propellant gases and non-condensable gases.

The method is based on the fact that the mechanical decomposition of the foam material which may be attached to one or more solid sides, e.g. a side plate of a refrigerator takes place in such a manner that the propellant does not escape into the atmosphere, as the foam material together with the propellants during the decomposition process and the liberation process, is surrounded/confined and thus in contact with a liquid medium, e.g. water.

By decomposing the foam material in a liquid medium having a temperature equal to or above the temperature corresponding to the boiling point of the propellant at the actual pressure, the propellant present in the structure (cells) of the foam material is liberated from the foam product.

This liberation of the propellant causes that the propellant contacts the liquid medium thereby ensuring that due to the temperature of the liquid medium, the propellant is liberated from the foam product as a gas, ascends as a gas, breaks the surface of the liquid medium and is collected under the top of the process container.

From the top of the process container all of the liberated gases are conducted through one or several containers containing a cold liquid medium, e.g. water in which a condensing takes place and/or the gases are conducted through one or several "cold traps" in which the propellant gases are being condensed.

By using a cold liquid medium for effecting said condensing, the condensed propellant and the cold liquid medium is provided according to the miscibility and density of the two media.

Thereafter, the propellant condensate is conducted to a succeeding treatment.

The above method may be effected inside a process container containing a liquid medium having a temperature equal to or above the temperature corresponding to the boiling point of the propellant at the actual pressure, said liberation process is performed by means of mechanical equipment located below the surface of the liquid medium performing a mechanical decomposition, e.g. rolling, compression and/or other ways of decomposing the foam material in such a manner that the propellant is pressed out of or/liberated from the foam product and is brought into contact with the surrounding liquid medium and is collected in a collecting part-/container and conducted to the codensation for a succeeding treatment.

The process container is constructed in a manner avoiding any uncontrolled blow offs of propellant gases into the atmosphere and ensuring that a minimum of non-condensable gases, e.g. air are added (introduced).

The process container is constructed in a manner ensuring that a minimum of non-condensable gases, e.g. air are carried along (introduced) by introduction of the material to be decomposed.

The upper part of the process container may act as a propellant gas collecting container from which the gases are conducted to condensing equipment, equipment for removing the remainder of the propellant from the air/gas mixture and equipment for optional removal of other extraneous gases.

The mechanical method of decomposing the foam depends on the nature of the foam material to be decomposed.

When mechanically decomposing the foam products, firm components, e.g. remainders of foam and metal wastes are removed from the process container by means of well-known technology.

By decomposing the foam material in a liquid medium, e.g. water having a temperature equal to or below the temperature corresponding to the boiling point of the propellant at the actual pressure, the propellant which is located in the structure (cells) of the foam material is liberated.

This liberation of the propellant causes that the propellant contacts the liquid medium whereby it is condensed (liquidized).

Due to any differencies of densities between the condensed propellant and the cooling medium and the non-miscibility between the propellant and the cooling medium, the/those condensed propellants and the cooling medium are located in the process container in separate layers.

The above method may be effected inside a process container containing a liquid medium having a temperature below the temperature corresponding to the boiling point of the propellant at the actual pressure, which decomposition is performed by means of mechanical equipment which is located below the surface of the liquid medium and in such a manner that the propellant is pressed out of or/liberated from the foam product and contacts the liquid medium whereby it is condensed.

Following the condensing process, according to its density, the condensed propellant will be located in the process container from which it can be recharged for a further treatment.

Succeedingly, the remaining gas/air mixture (mixture of equilibrium) is optionally conducted through one or several "cold traps" and/or through a medium, e.g. butanol which removes the remaining propellant gas. From this medium the propellant can be removed by distillation.

A smaller amount of the propellant will remain inside the process container in the liquid medium in a proportion corresponding to the solubility.

In a specific embodiment, the cold liquid medium can be identical (same product) with the condensed propellant.

The upper part of the process container may optionally act as a gas collecting container for non-condensed gases which may originate from the state of equilibrium of the materials.

From this part of the process container, the gases are conducted to equipment for a succeeding treatment for removal of remaining propellants from the air/gas mixture and further on to equipment for optional removal of other extraneous gases.

In order to avoid that undesired gases are blown off into the atmosphere non-condensable gases are removed through blow-off valves and/or through a controlled mechanical ventilation and are conducted to filter units outside the plant.

The process container is constructed in manner avoiding any uncontrolled blow-offs of propellant gases into the atmosphere and ensuring that a minimum of non-condensable gases, e.g. air, are added (introduced).

The process container is constructed in a manner ensuring that a minimum of non-condensable gases, e.g. air are carried along (introduced) by introduction of the material to be decomposed.

I claim:

1. A method for removing, condensing and collecting propellants from foam products, which method involves the use of a closed container in which a mechanical decomposition of the product is effected, said method comprising the steps of (a) mechanically decomposing a foam product which contains a propellant to liberate propellant from the product, and (b) collecting the liberated propellant, wherein the mechanical decomposition of the product and the liberation of the propellant is effected inside a cup-shaped process container having the closed part of the cup turned upwardly and the open part of the cup placed below the surface of a liquid medium under or in which liquid medium the decomposition and liberation is effected.

2. A method according to claim 1, further comprising the step of condensing the collected propellant, wherein the liquid medium in which the liberation of the propellant is taking place has a temperature equal to or above the temperature corresponding to the boiling point of the propellant at the actual pressure of the gaseous propellant after being collected in a gas collecting part and is conducted to a container containing a liquid medium in which the propellant is condensed, and wherein said liquid medium has a temperature which is below the temperature corresponding to the boiling point of the propellant at said actual pressure, said method further comprising removing the condensed propellant from said liquid medium for a succeeding treatment.

3. A method according to claim 1, wherein the liquid medium in which the liberation of the propellant takes place has a temperature which is below the temperature corresponding to the boiling point of the propellant at the desired working pressure, whereby the condensing of the propellant takes place in said liquid medium from which the propellant is removed for a succeeding treatment.

4. A method according to claim 1 wherein the condensing is performed by means of one or several cold traps in which the temperature is below the temperature corresponding to the dew point of the propellant.

5. A method according to claim 1, wherein the condensing is performed by means of a combination of a cold liquid medium and one of several cold traps.

6. A method according to claim 1, wherein a combination of several condensing steps by means of a liquid medium which optionally have different temperatures, and several cold traps which optionally have different temperatures takes place.

7. A method according to claim 1, wherein the method takes place in a process container closed with one or several traps.

* * * * *